US006181490B1

United States Patent
Wun et al.

(10) Patent No.: US 6,181,490 B1
(45) Date of Patent: Jan. 30, 2001

(54) OPTICALLY ADJUSTING DEVICE

(75) Inventors: Mu-Jung Wun; Jack Lin, both of Hsinchu (TW)

(73) Assignee: Lumens Mechniligy Inc., Hsinchu (TW)

( * ) Notice: Under 35 U.S.C. 154(b), the term of this patent shall be extended for 0 days.

(21) Appl. No.: 09/398,166

(22) Filed: Sep. 17, 1999

(30) Foreign Application Priority Data

Mar. 24, 1999 (TW) .................................. 88204502

(51) Int. Cl.[7] .............................. G02B 7/02; G02B 27/14

(52) U.S. Cl. ............................................ 359/822; 359/634

(58) Field of Search .................................. 359/634, 811, 359/819, 822, 250

(56) References Cited

U.S. PATENT DOCUMENTS 4,319,804  *  3/1982  Lipkins ................................ 359/529

* cited by examiner

Primary Examiner—Ricky Mack

(57) ABSTRACT

An optically adjusting device adapted to be used in a projector is provided. The optically adjusting device includes a frame having a plurality of frame members to define a space for containing an optical combiner therein, a plurality of light-receiving plates, each of which is disposed on one of the frame members for receiving a specific light beam and outputting the specific light beam to the optical combiner, and a plurality of adjusting plates, each of which is arranged between one of the frame members and a corresponding light-receiving plate for sequentially adjusting a position and orientation of the corresponding light-receiving plate with respect to the optical combiner.

17 Claims, 4 Drawing Sheets

OPTICALLY ADJUSTING DEVICE

FIELD OF THE INVENTION

The present invention is related to an optically adjusting device, and especially to an optically adjusting device adapted to be used in a projector.

BACKGROUND OF THE INVENTION

With the development of science, the living standard of human life grows swiftly. Many families have movie theaters at home to entertain themselves. A projector is one of the essential apparatuses to construct a home-movie theater.

FIG. 1 schematically shows the skeleton of a conventional projector. A light beam 11 from a light source is projected to a spectroscope 131 through a polarization beam splitter 12 (PBS) and a lens array 121. The first spectroscope 131 only allows the red light beam R to pass through but reflects the green light beam G and the blue light beam B. The reflected green and blue light beams G, B will be resolved by the second spectroscope 132. The second spectroscope 132 allows the blue light beam B to pass through and reflects the green light beam G. Therefore, as shown in FIG. 1, after the three basic light beams R, G, B are resolved and reflected by spectroscopes 131, 132 and mirrors 141, 142, 143, they enter into an optical combiner 17 from three different directions. The optical combiner 17 is a prismatic combiner, so called an X-cube. The X-cube 17 is used for refracting the three basic light beams R, G, B from three directions toward one direction. i.e. the direction of a focus plate 19.

Before the three basic light beams R, G, B enter into the X-cube 17, each of them will pass through two polarizers 15, 16. These two polarizers 15, 16 are used for adjusting the amount of a light beam (R, G, or B) entering the X-cube 17. After the three basic light beam R, G, B are refracted toward the direction of the focus plate 19, they are mixed as a mixed light beam 20 to be projected on the focus plate 19 by a projection lens system 18. The second polarizer 16 is usually assembled with the X-cube 17. After the X-cube is manufactured, the second polarizer 16 needs to be adjusted to ensure that the three basic light beam R, G, B can be perfectly projected on the focus plate 19 in an equal distance.

FIG. 2 schematically shows a conventional optically adjusting device. The adjusting device includes a frame 22 for fixing an X-cube 17 therein. There are three-layer metal plates 221, outside the frame 22. The second polarizer 16 (not shown) is fixed on the outmost metal plate 221. By adjusting screws 221, 212, 213, 214 and screw hole 215 on the adjusting device, the position and orientation of the second polarizer 16 are adjusted so that the vector parameters of the light beams (including horizontal vector x, vertical vector y, depth vector z, spin vector θ, and tilt vector ψ) are adjusted to ensure that the three basic light beams R, G, B can be perfectly projected on the focus plate 19 in an equal distance.

However, the conventional adjusting device still has many drawbacks. Some of them are described as follows:
1. The structure of the conventional adjusting device is very complex. The conventional adjusting device needs multi-layer metal plates to accomplish the adjustment thereby resulting in a difficulty in the manufacturing process and increasing the manufacturing cost.
2. A lot of heat will be generated from the polarizers when light beam are reflected thereon, but the conventional adjusting device can not dissipate heat easily because of its complex structure.

SUMMARY OF THE INVENTION

It is therefore an object of the present invention to provide a novel optically adjusting device such that the aforementioned limitations and drawbacks encountered in the prior art can be overcome.

It is still an object of the present invention to provide a novel optically adjusting device having, a simple structure.

It is further an object of the present invention to provide a novel optically adjusting device which can be manufactured easily.

Specifically, it is further an object of the present invention to provide a novel optically adjusting device capable of dissipating heat easily.

Specifically it is further an object of the present invention to provide a novel optically adjusting device adapted to be used in a projector.

The optically adjusting device of the present invention includes a frame having a plurality of frame members defining a space for containing an optical combiner therein, a plurality of light-receiving plates, each of which is disposed on one of the frame members for receiving a specific light beam and outputting the specific light beam to the optical combiner, and a plurality of adjusting plates, each of which is arranged between one of the frame members and a corresponding light-receiving plate for sequentially adjusting a position and orientation of the corresponding light-receiving plate with respect to the optical combiner.

The preferred embodiment of the optically adjusting device of the present invention includes a frame having two faces accompanied with three sides defining a space for containing an optical combiner therein, three light-receiving plates respectively disposed on the three sides of the frame for respectively receiving a specific light beam and outputting the specific light beam to the optical combiner, and three adjusting plates respectively arranged between the three sides of the frame and the three corresponding light-receiving plates for sequentially adjusting position and orientation of the light-receiving plates with respect to the optical combiner.

Preferably, the optical combiner is an X-cube.

According to the present invention, each of the plurality of adjusting plates is disposed on the corresponding frame member by screwing, and each of the adjusting plates includes an adjusting device for allowing a user to adjust the position and orientation of the corresponding light-receiving plate with respect to the optical combiner.

In accordance with the present invention, the adjusting device of the adjusting plate includes four adjusting nicks respectively disposed on four corners of the adjusting plate so as to allow the user to adjust the position and orientation of the corresponding light-receiving plate with respect to the optical combiner. In addition, the adjusting device of the adjusting plate further includes a plurality of springs arranged between the adjusting plate and the corresponding frame member to form a space between the adjusting plate and the corresponding frame member.

In accordance with the present invention, each of the plurality of springs is installed around a screw connecting the corresponding adjusting plate and the frame member together so that the user can adjust the position and orientation of the corresponding light-receiving plate with respect to the optical combiner by screwing.

Preferably, the plurality of springs are three springs.

According to the present invention, the plurality of frame member includes two clamping plates arranged around an upper and a bottom faces of the optical combiner.

According to the present invention, the plurality of frame members further include three locking plates respectively connectedd to the edges of the clamping plates by screwing so as to define the space for containing the optical combiner.

In accordance with the present invention, each of the plurality of adjusting plates is deposed on one of the three locking plates by screwing.

Preferably, the locking plates are metal plates, and each of the clamping plates is made of a material softer than that of the optical combiner.

According to the present invention, the light-receiving plate is a polarizer, preferably a liquid crystal display (LCD) polarizer.

According to the present invention, the specific light beam is one selected from a group consisting of red, green and blue light beam.

The present invention may best be understood through the following description with reference to the accompanying drawings, in which:

DETAILED DESCRIPTION OF THE PREFERRED EMBODIMENTS

Figure 1:
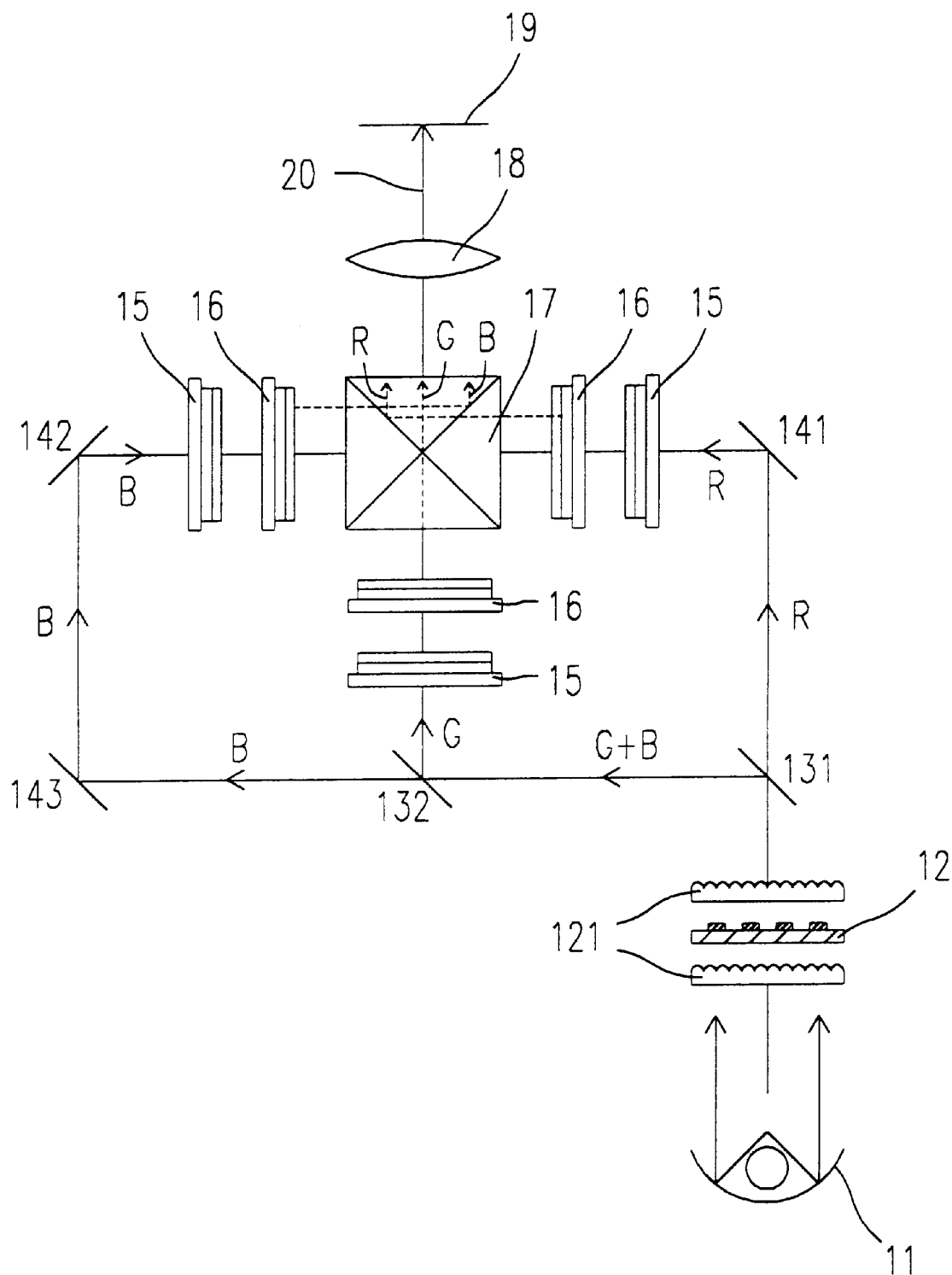
FIG. 1 schematically shows the skeleton of a conventional projector.
Figure 2:
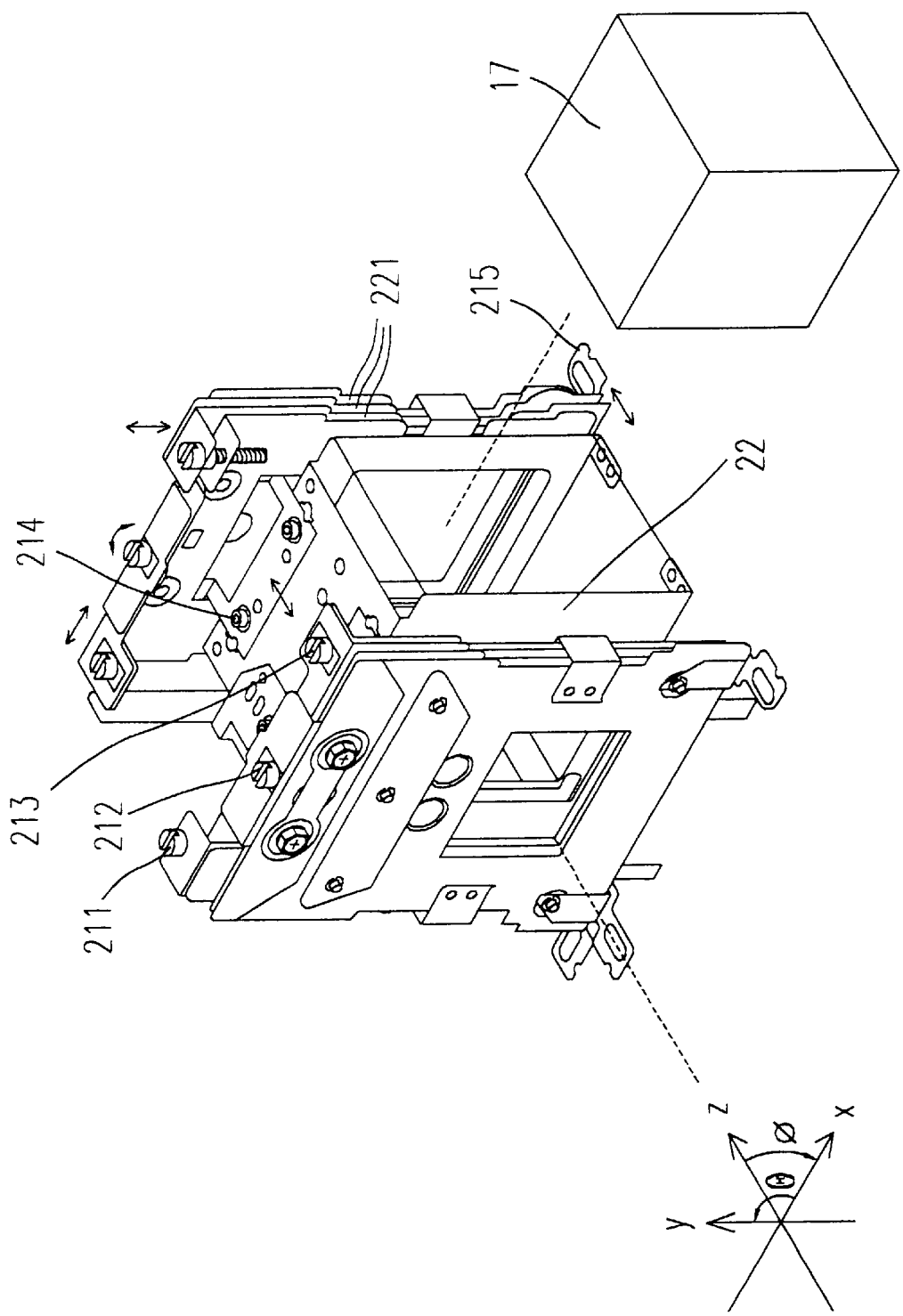
FIG. 2 schematically shows a conventional optically adjusting device.
Figure 3:
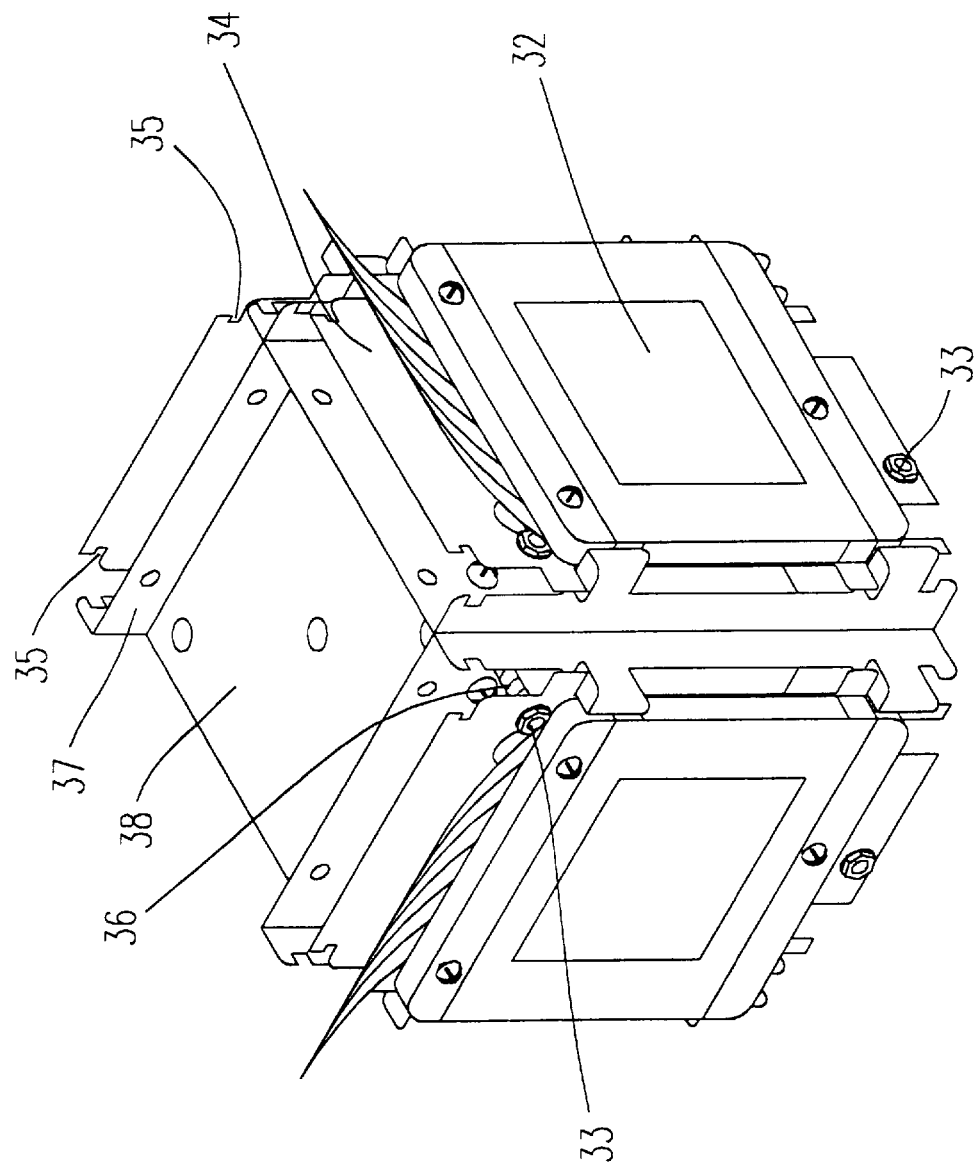
FIG. 3 schematically shows the optically adjusting device of the present invention.
Figure 4:
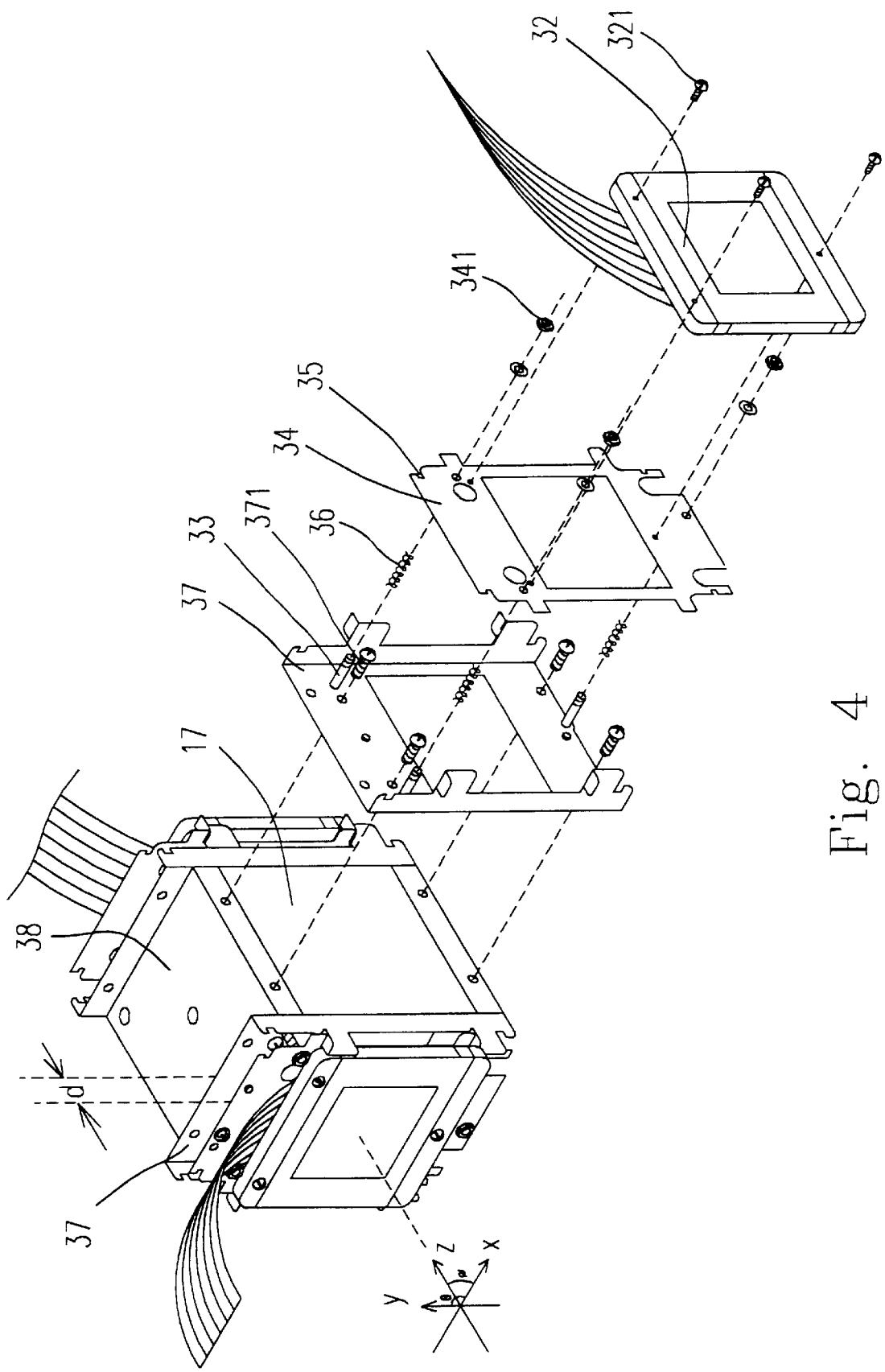
FIG. 4 is an exploded diagram of the optically adjusting device shown in FIG. 3.

Please refer to FIG. 3 and FIG. 4 showing the preferred embodiment of the optically adjusting device according to the present invention. The optically adjusting device is adapted to be used in a projector. It includes a frame for containing an optical combiner 17 therein, three light-receiving plates 32 for receiving a light beam and outputting the light beam to the optical combiner 17, and a plurality of adjusting plates 34 for sequentially adjusting the position and orientation of the corresponding light-receiving plate 32 with respect to the optical combiner 17. The frame is constructed by two clamping plates 38 arranged around an upper and a bottom faces of the optical combiner 17 and three locking plates 37 respectively connected to the edges of the clamping plates 38 by screwing 371.

The optical combiner 17 is preferably an X-cube, and the light beam includes red, green and blue light beams R, G, B. The light-receiving plates 32 are preferably polarizers, especially LCD polarizers. Each of the polarizers 32 is disposed on a corresponding locking plate 37 by screwing 321.

The adjusting plates 34 are arranged between the locking plates 37 and the polarizers 32 by screwing 341. Specifically, each of the adjusting plates 34 includes an adjusting device for allowing a user to adjust the position and orientation of the corresponding polarizer 32 with respect to the X-cube 17. The adjusting device includes four adjusting nicks 35 respectively disposed on four corners of the adjusting plate 34 and three springs 36 arranged between the adjusting plate 34 and the locking plate 37 to form a space d therebetween. Each of the springs 36 is installed around a screw 33 connecting the corresponding adjusting plate 34 and the locking plate 37 together. Therefore, by using a screwdriver to tilt the nicks 35, the horizontal vector x, the vertical vector y, and the spin vector $\theta$ are adjusted. In addition, by screwing the screws 33, the depth vector z and the tilt vector $\theta$ are adjusted. When the vector parameters are all adjusted, the three basic light beams R, G, B can be perfectly projected on the focus plate in an equal distance.

Moreover, the locking pates 37 are preferably metal plates and the clamping plates 38 are made of a material softer than that of the X-cube 17 so that the X-cube 17 can be fixed inside the frame tightly.

In conclusion, the advantages of the optically adjusting device of the present invention are described as follows:
1. The structure of the optically adjusting device of the present invention is very simple and only one adjusting plate is needed for each side of the frame. Therefore, the optically adjusting device can be easily manufactured in a lower cost.
2. Because there is a space between the adjusting plates and the locking plates, the heat generated from the polarizers can be easily dissipated.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optically adjusting device adapted to be used in a projector, comprising:
    a frame having a plurality of frame members defining a space for containing an optical combiner therein;
    a plurality of light-receiving plates, each of which is disposed on one of said frame members for receiving a specific light beam and outputting said specific light beam to said optical combiner; and
    a plurality of adjusting plates, each of which is arranged between one of said frame members and a corresponding light-receiving plate for sequentially adjusting a position and orientation of said corresponding light-receiving plate with respect to said optical combiner.

2. The optically adjusting device according to claim 1, wherein said optical combiner is an X-cube.

3. The optically adjusting device according to claim 1, wherein each of said plurality of adjusting plates is disposed on said corresponding frame member by screwing.

4. The optically adjusting device according to claim 1, wherein each of said adjusting plates includes an adjusting device for allowing a user to adjust said position and orientation of said corresponding light-receiving plate with respect to said optical combiner.

5. The optically adjusting device according to claim 4, wherein said adjusting device of said adjusting plate includes four adjusting nicks respectively disposed on four corners of said adjusting plate so as to allow the user to adjust said position and orientation of said corresponding light-receiving plate with respect to said optical combiner.

6. The optically adjusting device according to claim 5, wherein said adjusting device of said adjusting plate further includes a plurality of springs arranged between said adjusting plate and said corresponding frame member to form a space between said adjusting plate and said corresponding frame member.

7. The optically adjusting device according to claim 6, wherein each of said plurality of springs is installed around a screw connecting said which is mounted together said corresponding adjusting plate and said frame member together so that said user can adjust said position and orientation of said corresponding light-receiving plate with respect to said optical combiner by screwing.

8. The optically adjusting device according to claim 7, wherein said plurality of springs are three springs.

9. The optically adjusting device according to claim 1, wherein said plurality of frame member includes two clamping plates arranged around an upper and a bottom faces of said optical combiner.

10. The optically adjusting device according to claim 8, wherein said plurality of frame members further include three locking plates respectively connected to the edges of said clamping plates by screwing so as to define said space for containing said optical combiner.

11. The optically adjusting device according to claim 10, wherein each of said plurality of adjusting plates is deposed on one of said three locking plates by screwing.

12. The optically adjusting device according to claim 10, wherein said locking plates are metal plates.

13. The optically adjusting device according to claim 9, wherein each of said clamping plates is made of a material softer than that of said optical combiner.

14. The optically adjusting device according to claim 1, wherein said light-receiving plate is a polarizer.

15. The optically adjusting device according to claim 14, wherein said polarizer is a liquid crystal display (LCD) polarizer.

16. The optically adjusting device according to claim 1, wherein said specific light beam is one selected from a group consisting of red, green and blue light beams.

17. An optically adjusting device adapted to be used in a projector, comprising:

a frame having two faces accompanied with three sides to define a space for containing an optical combiner therein;

three light-receiving plates respectively disposed on said three sides of said frame for respectively receiving a specific light beam and outputting said specific light beam to said optical combiner; and three adjusting plates respectively arranged between said three sides of said frame and said three corresponding light-receiving plates for sequentially adjusting positions and orientations of said light-receiving plates with respect to said optical combiner.

* * * * *